United States Patent Office 3,450,334
Patented June 17, 1969

3,450,334
PRESSURE EXCHANGERS
James Brown, Coventry, England, assignor to Power Jets (Research & Development) Limited, London, England
Filed June 26, 1967, Ser. No. 648,915
Claims priority, application Great Britain, June 28, 1966, 28,926
Int. Cl. F04b 37/02
U.S. Cl. 230—69        7 Claims

ABSTRACT OF THE DISCLOSURE

A pressure exchanger comprises a cell ring mounted for rotation between a pair of end-plates having bearings which support stub shafts secured to the cell ring. The cell has a plurality of open-ended cells arranged side by side in a circle and which are effectively closed by the end-plates. Ports formed in the end-plates communicate with the cells according to the rotation of the cell ring. One end-plate and its associated bearing is secured to a casing which encloses the cell ring while the bearing of the second end-plate is carried in a sleeve which is a sliding fit in an annular plate secured to the adjacent end of the casing. A further sleeve secured to the periphery of the last-mentioned end-plate extends coaxially about the cell ring within the casing in which it is a sliding fit in the region of the first end-plate. The second end-plate and its bearing may thus move axially relative to the first end-plate and a chamber isolated from the cell ring is formed within the casing. Ducts extend from the ports in the second end-plate through that part of the chamber between the said end-plate and the annular plate to the outside of the casing being provided with appropriate seals where they pass through the annular plate. High pressure gas leaking from the cell ring acts to pressurise the chamber and flow into the low pressure system without materially disturbing the smooth flow of low pressure gas.

Figure 1:
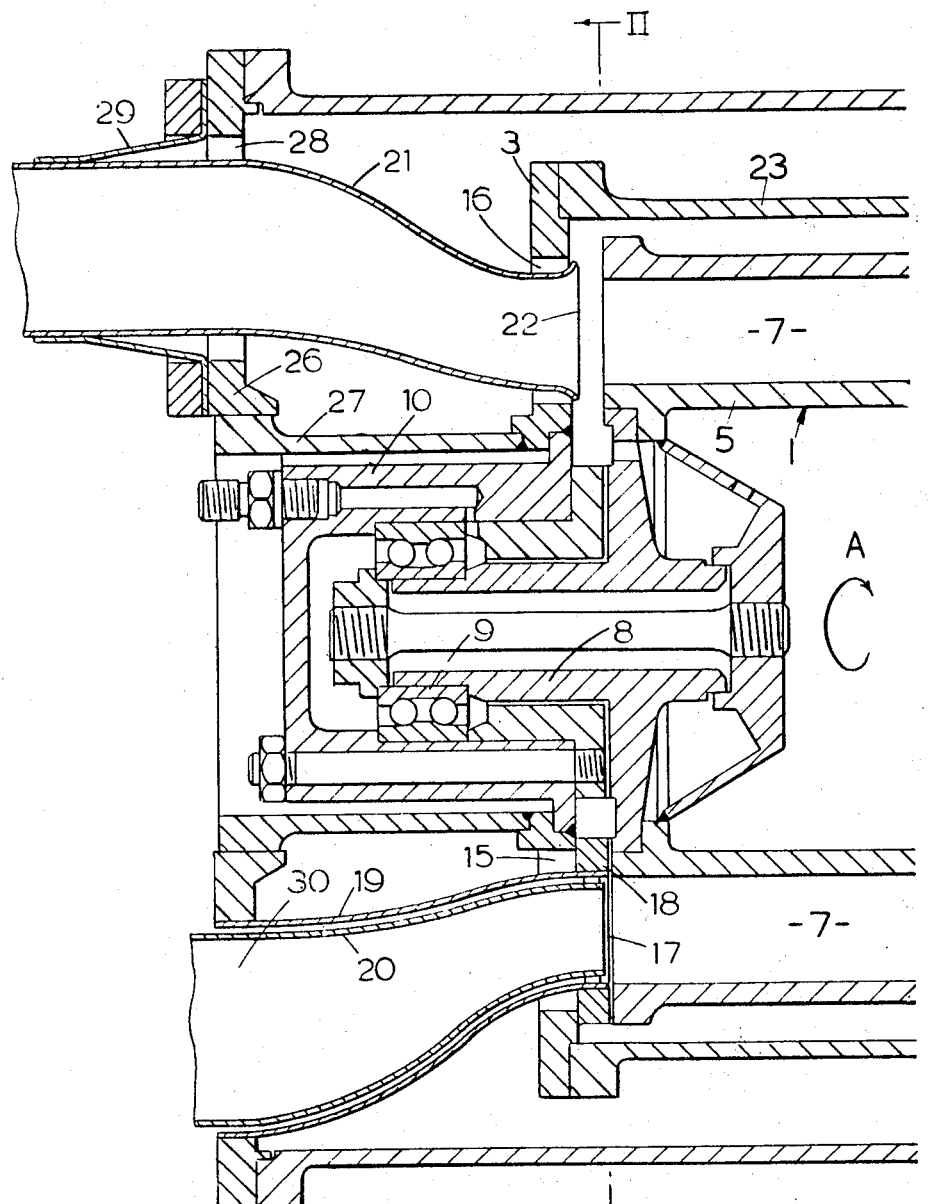

The present invention relates to pressure exchangers.

The term "pressure exchanger" is used herein to define apparatus comprising cells in which one gas quantity expands so compressing another gas quantity with which it is in direct contact, ducting to lead gas substantially steadily to and from the cells at different pressures, and means to effect relative motion between the cells and the ducting.

One practical form of pressure exchanger as above defined comprises a plurality of open-ended cells arranged side by side in a circle to form a cell ring which is mounted for rotation between a pair of end-plates which effectively close the open ends of the cells. One or more ports are formed in each end-plate to place the cells in communication with ducts associated with the ports as the cell ring rotates. Generally the cell ring is enclosed by structure extending between the end-plates.

If such a pressure exchanger is to operate with maximum efficiency it is essential that leakage of gas from the cells through the clearances between each end of the cell ring and its adjacent end-plate be kept to a minimum. Because of the relatively high speeds of rotation required for operation of the pressure exchanger, conventional rubbing seals are, in general, impractical and gas leakage is usually restricted by making the clearance between the ends of the cell ring and the end-plates as small as possible. However, if hot gases are used it has been found difficult to maintain the desired clearances owing to differential thermal expansion of the various parts of the pressure exchanger. Wastage of higher pressure gas due to leakage from the cells is not the only cause of reduction in efficiency of the pressure exchanger. It has also been found that the smooth flow of gas into or out of cells receiving gas at a lower pressure can, in some circumstances, be disturbed by the entry of leakage gas through the clearance between the cell ring and the end-plate adjacent those cells. Further, the leakage gas at the centre and periphery of the cell ring applies pressure to one face only of each end-plate and therefore may add to the difficulties of maintaining small clearances between the end-plates and the ends of the cell ring.

According to the present invention a pressure exchanger comprises a plurality of open-ended cells arranged to form a cell ring mounted for rotation between a pair of end-plates which effectively close the open ends of the cells, one of the end-plates having a low-pressure outlet port, a casing forming with the ported end-plate a chamber on the side of the end-plate remote from the cell ring and a duct extending through the chamber to open at one end in proximity to the adjacent end of the cell ring and at the other end to the exterior of the casing, the periphery of the duct adjacent said one end being spaced from the surface of the end-plate bounding the outlet port and the periphery of the duct adjacent said other end being sealed to the casing.

The ported end-plate is constrained to follow axial movement of the adjacent end of the cell ring relative to the remote end of the cell ring.

Preferably the duct is sealed to the casing by means permitting expansion of the duct relative to the casing.

Advantageously the end of the duct in proximity to the cell ring is flared.

Figure 1A:
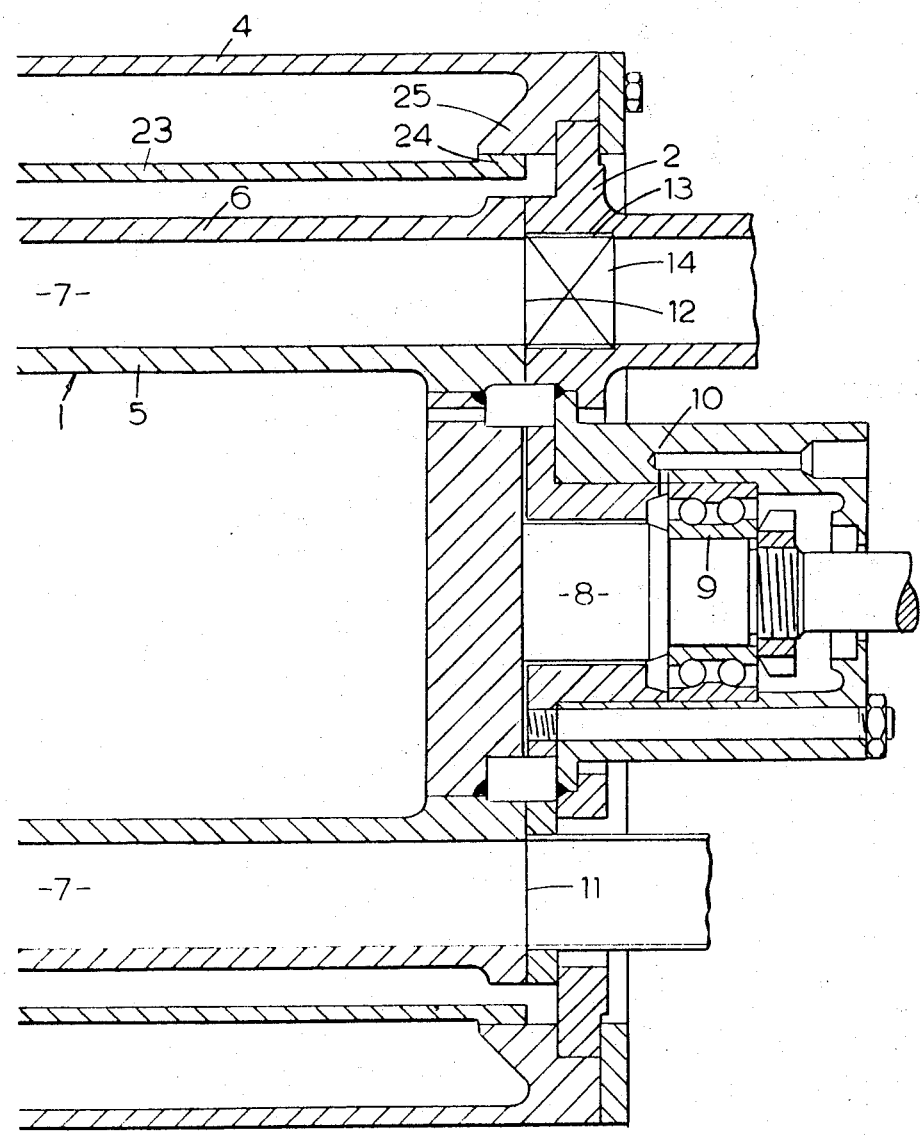
Figure 2:
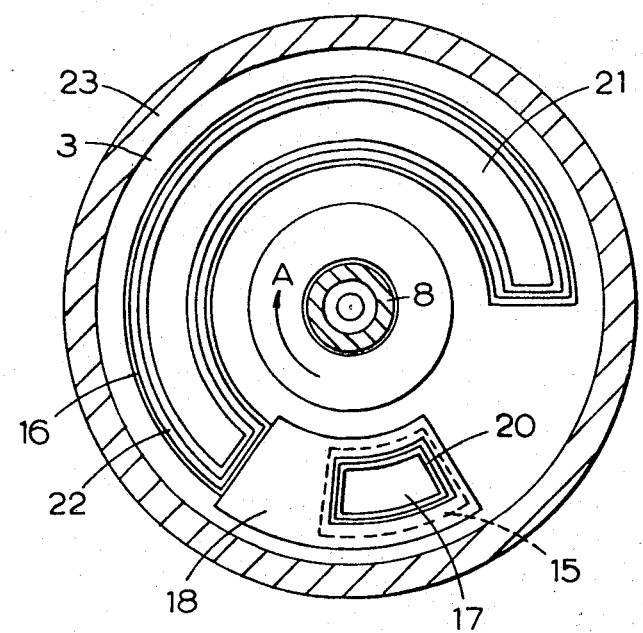

An embodiment of the invention is now described by way of example, reference being made to the accompanying drawings in which:

FIGURES 1 and 1A show in axial section a pressure exchanger according to the invention; and FIGURE 2 is a cross-section on a reduced scale on the line II—II of FIGURE 1.

The pressure exchanger of FIGURE 1 comprises a cell ring 1 mounted for rotation between end-plates 2 and 3 and within a casing formed in part by a tube 4 which is secured at one end to the periphery of the end-plate 2. The cell ring 1 is formed by inner and outer tubular members 5, 6 arranged co-axially with the annular space between the members subdivided by walls 7 into a plurality of axially extending cells. Each end of the cell ring 1 is secured to a stub-shaft 8 which is mounted for rotation in a bearing 9 retained in a housing 10 fixed to the adjacent end-plate 2, 3. The bearing 9 constrains its associated end-plate against axial movement relative to the adjacent end of the cell ring 1.

The end-plate 2 is formed with a generally arcuate high-pressure outlet port 11 and a similarly shaped but arcuately longer low-pressure inlet port 12. The inlet port 12 is provided with a correspondingly shaped insert 13 carrying guide vanes 14. The end-plate 2 locates, by means of the bearing 9, the adjacent end of the cell ring so that there is the minimum clearance between the opposed faces of the end of the cell ring 1 and the end-plate 2 that will permit free rotation of the cell ring under all operating conditions of the pressure exchanger.

The end-plate 3, FIGURES 1 and 2, is provided with openings 15 and 16 which correspond in location to high and low-pressure inlet and outlet ports respectively, of a more conventional end-plate, such as the end-plate 2. The high-pressure inlet port 17 proper, is formed in an arcuate plate 18 secured to the face of the end-plate 3 adjacent the cell ring 1 with the port 17 in register with the opening 15. The plate 18 extends circumferentially from adjacent the leading edge of the opening 15 to adjacent the leading edge (considered with respect to the direction of rotation of the cell ring 1) of the opening 16 corresponding to the outlet port. The face of the plate 18 adjacent the cell ring 1 is accurately machined and the clearance between the machined face and the opposed end-face of the cell ring is set to a minimum, by means of the bearing 9, consistent with free rotation of the cell ring under all operating conditions of the pressure exchanger. A duct 19 is secured to the plate 18 round the periphery of the port 17 and is provided with a lining 20 held spaced from the inner surface of the duct 19 to form a hollow double-wall structure. The clearance between the end-plate 3 over the arc of the outlet opening 16 and the adjacent end of the cell ring 1 is at least equal to the thickness of the plate 18. A duct 21 extends through the outlet opening 16 and is formed with a flared mouth 22 which is disposed in proximity to the adjacent end of the cell ring 1. The mouth 22 of the duct 21 constitutes the low-pressure outlet port of the pressure exchanger and is spaced from the adjacent end of the cell ring 1 a considerable distance in comparison with the distance between the opposed faces of the plate 18 and the end of the cell ring 1. The periphery of the duct 21 is spaced from the surface of the end-plate 3 bounding the opening 16.

A cylindrical sleeve 23 is secured at one end to the periphery of the end-plate 3 and extends coaxially of the cell ring 1. The other end of the sleeve 23 is formed with a flange 24 which is a sliding fit in an inward annular extension 25 of the tube 4 adjacent the end-plate 2. An annular plate 26 is secured to the end of the tube 4 adjacent the end-plate 3, the radially inner surface of the plate 26 being a sliding fit on a sleeve 27 secured to the end-plate 3 and encircling the bearing housing 10. The tube 4 and the plate 26 together form a casing in which the end-plate 3 and the sleeve 23 can slide axially in the manner of a telescope so that relative axial movement between the end-plates 2 and 3 can occur while they are maintained coaxial.

The duct 21 extends through an arcuate opening 28 in the plate 26 and is supported from the plate by a sleeve 29 which is secured at one end round the periphery of the duct 21 and at the other end round the periphery of the opening 28. The sleeve 29 is designed to permit radial expansion of the duct 21 while forming a gas tight seal between the outer surface of the duct and the opening 28. A substantially circular opening 30 is formed in the plate 26 to receive the adjacent end of the duct 19. The duct 19 changes from arcuate cross-section at the port 17 to circular cross-section at the opening 30 where it terminates as a sliding fit within the opening 30. The lining 20 of the duct 19 similarly changes in cross-section and extends beyond the plate 26.

When the pressure exchanger is in operation the cell ring is caused to rotate, in the direction indicated by the arrow A, and low-pressure gas (which may be air) enters each cell as it opens to the port 12. The cells next open to the inlet port 17 where high-pressure gas enters the cells and expands so compressing the gas already in the cells, the compressed gas leaving the cells through the outlet port 11. As the cell ring continues to rotate the cells become closed at each end by the end-plates 2, 3 thus trapping the expanded gas within the cells. When the cells open to the port constituted by the mouth 22 of the duct 21 the expanded gas flows from the cells into the duct 21 and is replaced by fresh gas entering through the port 12. The cycle of operation is then repeated on each revolution of the cell ring 1.

It is to be understood that the description given of the operation of a pressure exchanger is much simplified and that in practice the effective opening and closing of the cells will be "timed" to take advantage of the pressure waves generated in the cells during each cycle.

During operation, gas at high pressure is entering the cells through the port 17 and leaving the cells through the port 11. Although the clearance between each end of the cell ring 1 and its associated end-plate 2, 3 is maintained at a minimum adjacent the ports 17 and 11 there is some leakage of gas into the spaces at the centre and at the periphery of the cell ring 1. In previous constructions this leakage gas has flowed through the correspondingly small clearances adjacent the low-pressure inlet and outlet ports at a velocity which tended to disturb the smooth flow of low-pressure gas entering and leaving the cells through these ports. However, the arcuate length of the leakage flow path adjacent the low-pressure ports is so much longer than that adjacent the high-pressure ports that the clearance between the end of the cell ring and the associated end-plate adjacent the low-pressure port has no controlling effect on the total leakage gas flow. Therefore, in the present construction the low-pressure outlet port is constituted by the duct 21 whose mouth 22 is so shaped and spaced from the adjacent end of the cell ring 1 that leakage gas may readily enter the low-pressure gas stream at low velocity and flow over the inner surfaces of the duct 21 to provide a film of relatively cool gas, without materially disturbing the smooth flow of low-pressure gas.

Also in the present construction some of the leakage gas flows through the gap between the periphery of the duct 21 and the opening 16 in the end-plate 3 thus pressurising the closed space between the end-plate 3 and the sleeve 23, and the casing. The presence of gas under pressure within this space has the advantage that it counterbalances the pressure of the leakage gas on the opposite side of the end-plate. The pressure of the leakage gas also tends to counter-balance the pressure of the gas within the ducts 19 and 21; this is specially important in the case of the duct 21 because its necessarily awkward shape makes it particularly susceptible to distortion when subjected to unbalanced pressures. Further, the leakage gas helps to maintain a uniform temperature within the casing thereby reducing the possibility of differential thermal expansion of the pressure exchanger parts.

In an alternative embodiment, not illustrated, the end-plate 3 is dimensioned to be a sliding fit within the tube 4. The engagement of the periphery of the end-plate 3 with the inner surface of the tube 4 holds the end-plate 3 co-axial with the end-plate 2 and the sleeve 23 may be discarded. If desired, the end-plate 3 may be rigidly secured co-axially of the tube 4 and the end-plate 2 made axially movable to allow for axial expansion of the cell ring 1.

The duct lining 20 and, in particular, the duct 21 may each be enclosed in a casing extension secured to the plate 26 and arranged to be pressurised by the leakage gas. It is envisaged that the casing extension or extensions be used to mount the pressure exchanger on the apparatus, for example another pressure exchanger, in communication with the cells of the cell ring.

I claim:

1. A pressure exchanger comprising a plurality of open ended cells arranged to form a cell ring, a pair of end-plates, said cell being mounted for rotation between said end-plate such that said end-plates effectively close the open ends of the cells, a low-pressure gas outlet port formed in one of the end-plates, a casing serving with the ported end-plate to define a chamber on the side of that end-plate remote from the cell ring, and a duct extending through the chamber to open at one end in proximity to the adjacent end of the cell ring and at the other end to the exterior of the casing, the periphery of the duct adjacent said one end being spaced from the surface of the end-plate bounding the outlet port and, the periphery of the duct adjacent said other end being sealed to the casing, and the ported end-plate being constrained to follow axial movement of the adjacent end of the cell ring relative to the remote end of the cell ring.

2. A pressure exchanger according to claim 1 in which the duct is sealed to the casing by means permitting expansion of the duct relative to the casing.

3. A pressure exchanger according to claim 1 in which the end of the duct in proximity to the cell ring is flared.

4. A pressure exchanger according to claim 1 further comprising a sleeve within the casing disposed co-axially about the cell ring and an inner annular surface provided on the casing adjacent to the other end-plate, the sleeve being secured at one end to the periphery of the ported end-plate and having a flange formed on its other end arranged to slide within the inner annular surface.

5. A pressure exchanger according to claim 1 having a high pressure gas inlet port formed in the ported end-plate, an opening in the casing, and a further duct extending through the chamber between the inlet port and the opening, the said further duct being attached at one end to the boundary of the inlet port with its other end sliding within the opening.

6. A pressure exchanger according to claim 5 having a lining spaced from the inner surface of the said further duct to form a hollow double-wall structure.

7. A pressure exchanger according to claim 6 in which a part of the lining extends through the casing and is enclosed in a casing extension arranged to be pressurised by gas leakage from the cell ring.

References Cited
UNITED STATES PATENTS 2,766,928 10/1956 Jendrassik.
2,836,346 5/1958 Jendrassik.

ROBERT M. WALKER, *Primary Examiner.*